United States Patent
Ben Dayan et al.

(10) Patent No.: US 11,301,433 B2
(45) Date of Patent: Apr. 12, 2022

(54) METADATA JOURNAL IN A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd.

( * ) Notice: Subject to any disclaimer, the term of this patent is extended or adjusted under 35 U.S.C. 154(b) by 78 days.

(21) Appl. No.: 16/121,496

(22) Filed: Sep. 4, 2018

(65) Prior Publication Data

US 2019/0147069 A1    May 16, 2019

Related U.S. Application Data

(60) Provisional application No. 62/585,063, filed on Nov. 13, 2017.

(51) Int. Cl.
*G06F 16/182* (2019.01)
*G06F 3/06* (2006.01)
*G06F 16/188* (2019.01)
*G06F 16/174* (2019.01)
*H04L 67/1097* (2022.01)

(52) U.S. Cl.
CPC ............. *G06F 16/183* (2019.01); *G06F 3/06* (2013.01); *G06F 16/1744* (2019.01); *G06F 16/188* (2019.01); *H04L 67/1097* (2013.01)

(58) Field of Classification Search
CPC ............................. G06F 16/183; G06F 16/188
See application file for complete search history.

(56) References Cited

U.S. PATENT DOCUMENTS

| 6,487,636 B1 | 11/2002 | Dolphin et al. |
| 7,447,839 B2 | 4/2008 | Uppala |
| 7,681,072 B1 | 3/2010 | Gibson et al. |
| 7,739,677 B1 * | 6/2010 | Kekre ................. G06F 11/1425 717/168 |
| 7,793,146 B1 | 9/2010 | Gibson et al. |
| 7,877,511 B1 | 1/2011 | Berger et al. |

(Continued)

FOREIGN PATENT DOCUMENTS

EP    2372520 A1    10/2011

OTHER PUBLICATIONS

Int'l Search Report and Written Opinion Appln No. PCT/IB2016/001177 dated Dec. 2, 2016.

(Continued)

*Primary Examiner* — Grace Park
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. Each computing device is operable to compress one or more blocks of data and append a journal in front of the data. The journal and the data are written concurrently to flash memory. Each computing device is also operable to maintain a metadata registry that records changes in the flash memory. In the event of a power failure, the journal and previous journals may be used to verify the state of the metadata registry.

19 Claims, 7 Drawing Sheets

(56) References Cited

U.S. PATENT DOCUMENTS

| | | |
|---|---|---|
| 8,347,010 B1 | 1/2013 | Radovanovic |
| 8,645,749 B2 | 2/2014 | Reche |
| 8,918,478 B2 | 12/2014 | Ozzie et al. |
| 9,020,987 B1* | 4/2015 | Nanda ................. G06F 16/1734 707/821 |
| 9,087,012 B1 | 7/2015 | Hayes et al. |
| 9,448,887 B1 | 9/2016 | Ben Dayan et al. |
| 9,747,162 B2 | 8/2017 | Ben Dayan et al. |
| 2003/0115218 A1 | 6/2003 | Bobbitt et al. |
| 2004/0098415 A1 | 5/2004 | Bone et al. |
| 2005/0289152 A1 | 12/2005 | Earl et al. |
| 2007/0061542 A1 | 3/2007 | Uppala |
| 2007/0143261 A1 | 6/2007 | Uppala |
| 2007/0143311 A1 | 6/2007 | Uppala |
| 2009/0119541 A1 | 5/2009 | Inoue et al. |
| 2010/0199125 A1 | 8/2010 | Reche |
| 2011/0213994 A1 | 9/2011 | Thereska et al. |
| 2012/0210095 A1 | 8/2012 | Nellans et al. |
| 2013/0326117 A1 | 12/2013 | Aune |
| 2014/0244897 A1 | 8/2014 | Goss et al. |
| 2014/0281280 A1 | 9/2014 | Goss et al. |
| 2015/0074458 A1* | 3/2015 | Atluri ................. G06F 11/1453 714/19 |
| 2015/0248366 A1 | 9/2015 | Bergsten et al. |
| 2015/0254088 A1 | 9/2015 | Chou et al. |
| 2015/0355971 A1 | 12/2015 | Becker-Szendy et al. |
| 2016/0246677 A1 | 8/2016 | Sangamkar et al. |
| 2017/0132091 A1* | 5/2017 | Leshinsky ........... G06F 11/1471 |
| 2017/0357462 A1* | 12/2017 | Walker ................ G06F 12/0623 |

OTHER PUBLICATIONS

Int'l Preliminary Report on Patentability Appln No. PCT/IB2016/001177 dated Mar. 8, 2018.

Int'l Search Report and Written Opinion Appln No. PCT/IB2016/000996 dated Oct. 20, 2016.

Int'l Preliminary Report on Patentability Appln No. PCT/IB2016/000996 dated Jan. 2, 2018.

Extended European Search Report Appln No. 16817312.8-1217 dated Oct. 25, 2018.

Int'l Search Report and Written Opinion Appln No. PCT/IB2018/001283 dated Mar. 22, 2019 (11 pgs).

Int'l Preliminary Report on Patentability Appln No. PCT/IB2018/001283 dated May 28, 2020 (6 pgs).

Extended European Search Report Appln No. 18875842.9 dated Jul. 8, 2021.

* cited by examiner though the client application and the VFS processes are not shown as such in FIG. 2.

METADATA JOURNAL IN A DISTRIBUTED STORAGE SYSTEM

PRIORITY CLAIM

This application claims priority to the following application, which is hereby incorporated herein by reference:
U.S. provisional patent application 62/585,063 titled "Metadata Journal In A Distributed Storage System" filed on Nov. 13, 2017.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for a metadata journal in a distributed storage system substantially as illustrated by and/or described in connection with at least one of the figures, as set forth more completely in the claims.

DETAILED DESCRIPTION

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
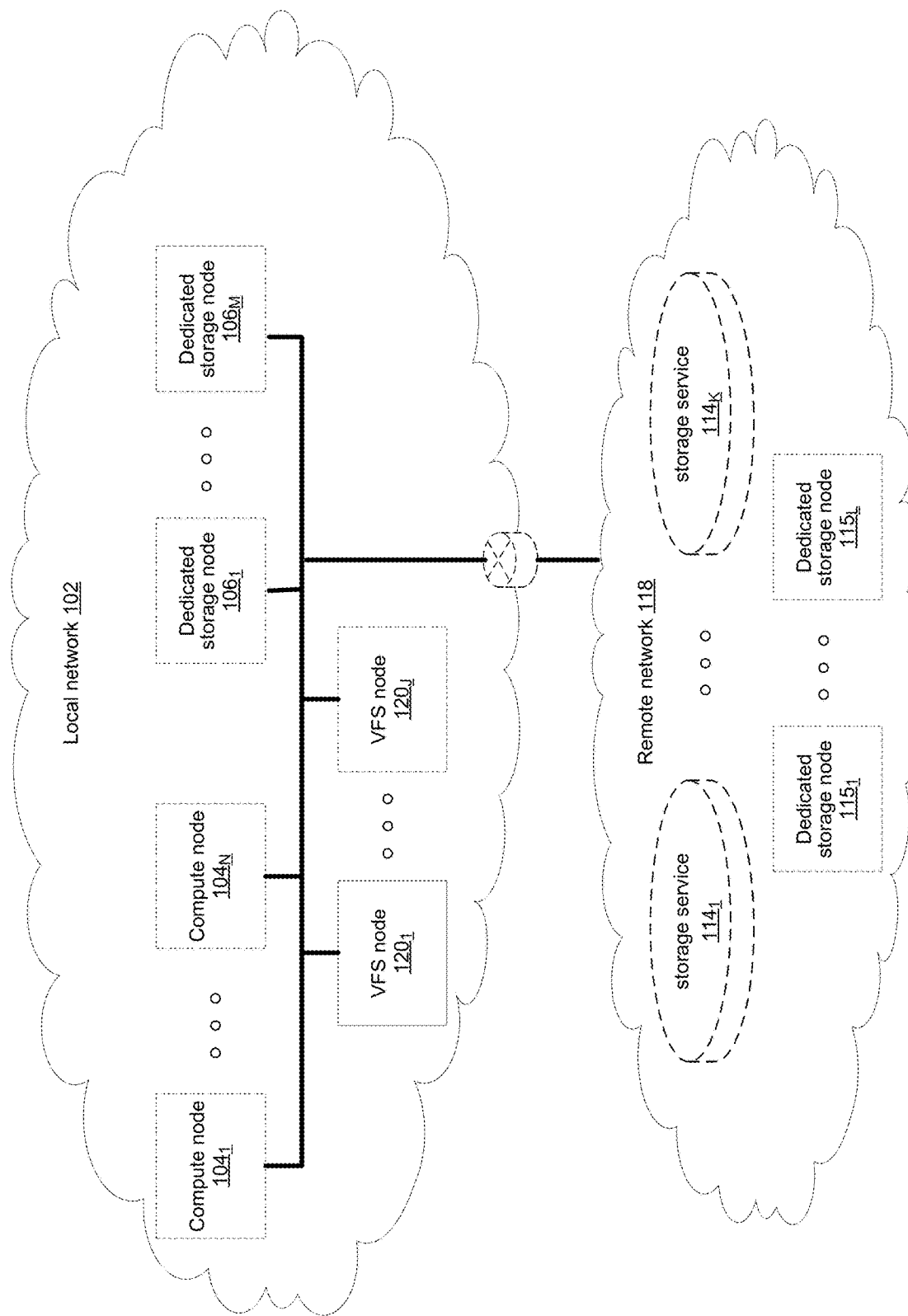
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each VFS node $120_j$ (j an integer, where $1 \leq j \leq J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
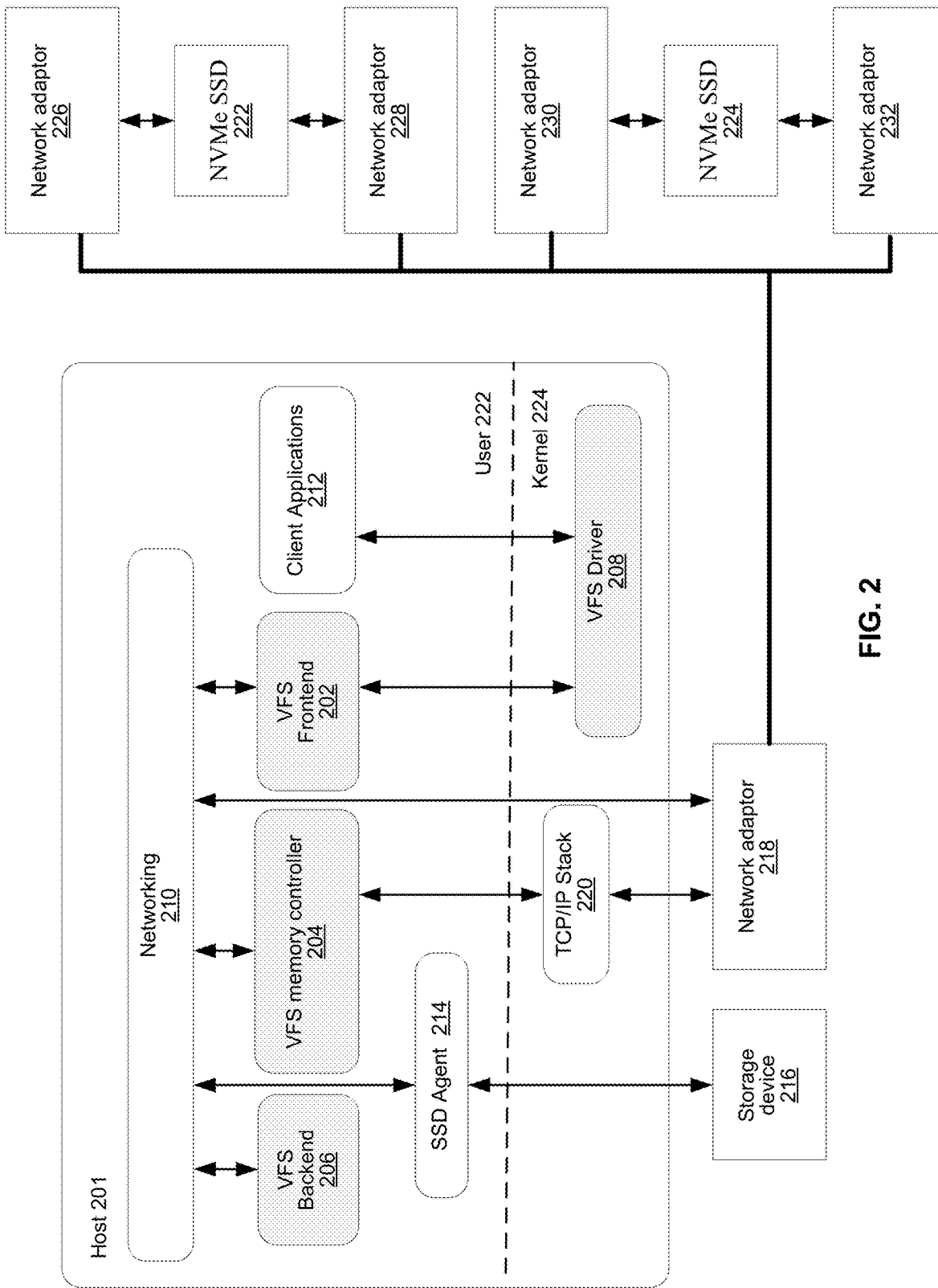
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
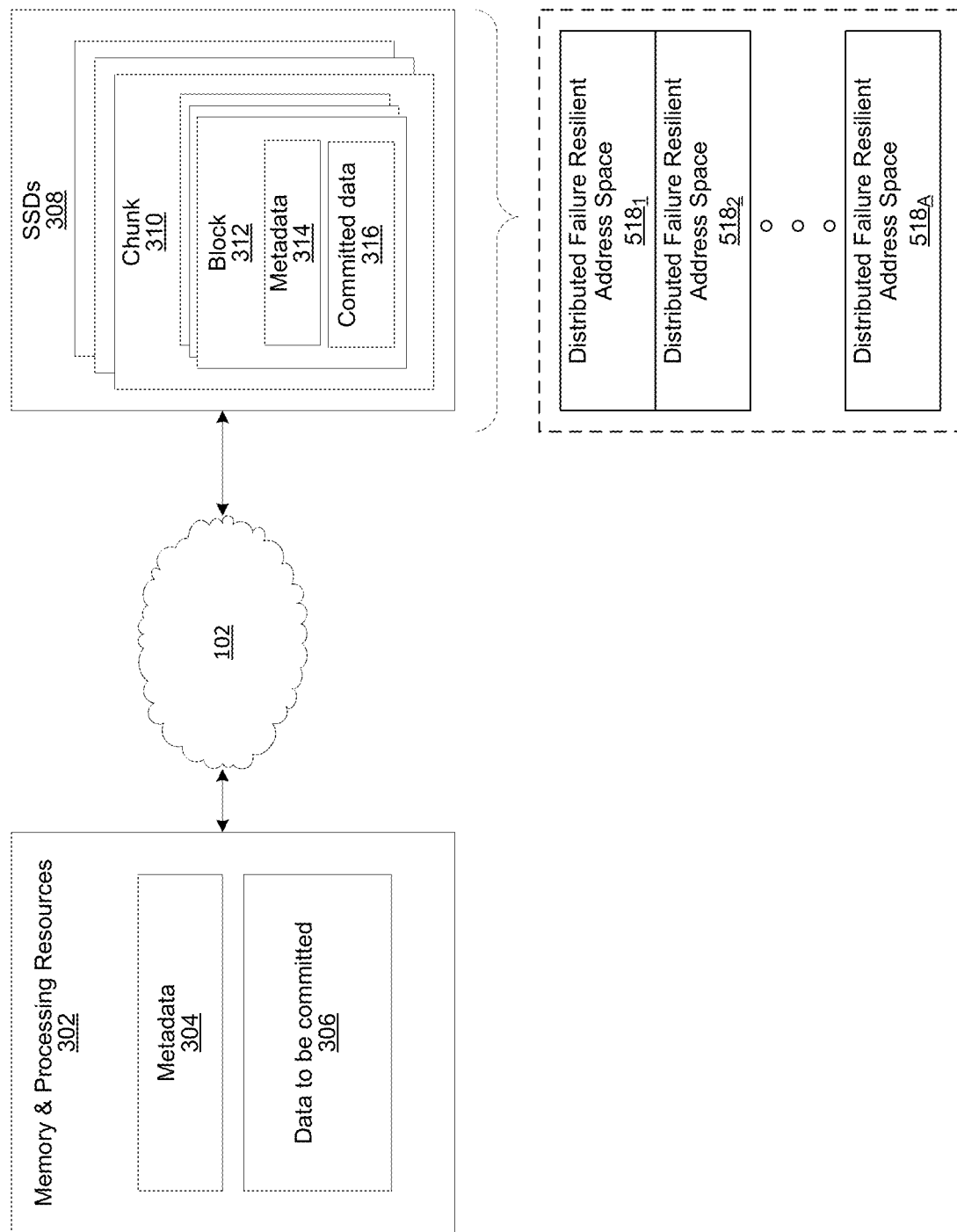
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., ×86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000

$$\left(\frac{26!}{5!*(26-5)!}\right)$$

possible live-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

Figure 4A:
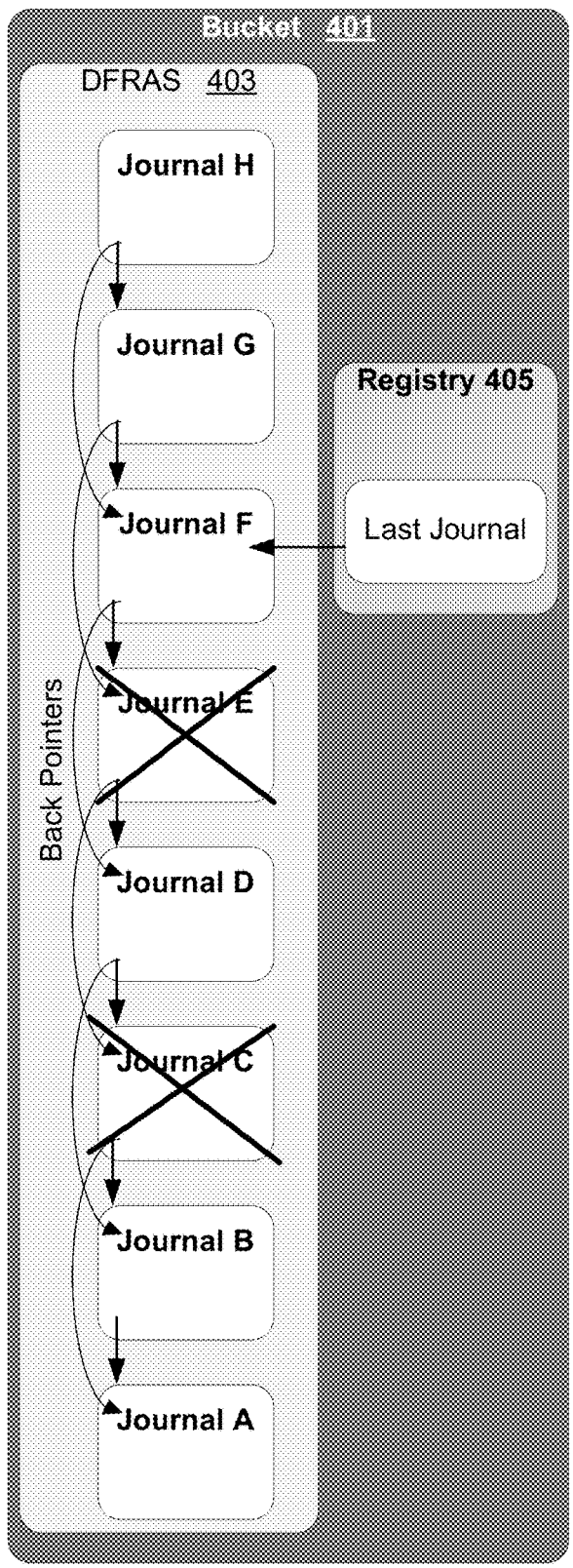
FIGS. 4A and 4B illustrate examples of a journal linked list and a registry in accordance with an example implementation of this disclosure.
Figure 4B:
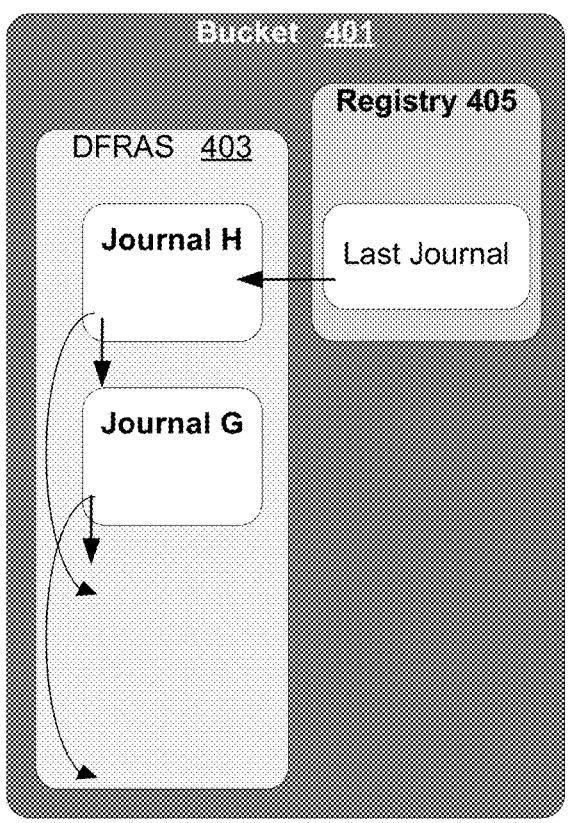

FIGS. 4A and 4B illustrate examples of a journal linked list and a registry in accordance with an example implementation of this disclosure. Each bucket has its own journal linked list, and many sets of journals may cooperate over the entire cluster, as each cluster contains a large number of buckets working concurrently. The registry and journal are combined to provide coherent operations that work well with failover and rebalances. In order to write level the registry, the registry may be written to disk every several hundred (or several thousand) operations and the journal may be used to in the event of a failure.

In FIGS. 4A and 4B, bucket 401 is in charge of a DFRAS 403 and controls an associated metadata registry 405. DFRAS 403 comprises a linked list of metadata journals that keep track of higher level operations and ensure their persistence in case of a failure. Each journal (i.e., each of journals A-H in FIG. 4A and journals G-H in FIG. 4B) in DFRAS 403 is associated with a DFRAS operation.

Each journal block has pointers (i.e., "back pointers") to several previous journal blocks before it. These back pointers may form a linked list with resilience. For example, if the last journal block is known and it points to the three previous journal blocks, the next to the last journal block shares two of the pointers with the last journal block, etc. For illustration purposes, a maximum of two back pointers are associated with each journal. However, in other embodiments there may be more or less than two back pointers associated with each journal. The back pointers may be 4 bytes long, for example.

The metadata registry 405 may be within the RAM of the same server that runs the bucket, and the metadata registry 405 may be check-pointed to the DFRAS 403 in the manner described below to provide recoverable persistence for all state-changing operations performed on the VFS (e.g., data write, metadata changes, etc.).

Bucket 401 keeps and manages its own registry 405. The registry 405 may be used to go from pointers/keys to block data. Part of the data stored in the registry 405 is the ID of the object pointing (i.e., the "back pointer") to a 4 k data block. The back pointer may be used to differentiate between objects. Different kinds of object may have the same ID, but they cannot be pointed to by the same object ID. Therefore, knowing the object ID allows concurrent reads to be performed for all the blocks that may have the same object ID, and only the one with the correct back pointer is returned. Because these concurrent reads may be performed in parallel, the overall latency is kept very low.

The registry also indicates the last journal when data was committed to the DFRAS. As illustrated by the "last journal" pointer in registry 405, journals A-F in FIG. 4A have been destaged and committed to NVM. All future "dirty" information in RAM is waiting to be destaged. According to the DFRAS state illustrated in FIG. 4A, only journals H and G may contain information that has not been committed to NVM. Journals A-F may be garbage collected, as journals C and E.

FIG. 4B illustrates DFRAS 403 after journals A-F are garbage collected. Also, because the "last journal" pointer in FIG. 4B has moved to journal H, journals H and G are no longer needed.

Once a registry gets destaged to the DFRAS, the journals that created are no longer needed, and these journal entries may be marked for potential freeing/garbage collection and removal. Once these already accounted-for journal entries are removed, the pointers may still point to them, but because the blocks there would not contain valid journal entries with the right ID, the replay mechanism would know that this is the beginning (earliest) block of a journal entry that we should consider replaying. For example, in FIG. 4A, the metadata associated with journals A-F have been saved to flash. Therefore, journals A-F are not replayed.

A metadata registry remembers the current "head" of the journal linked list (i.e., "last journal"), and once it finished saving its state to disk, the registry can go back to the journal and free it from that head until the tail. In this way, the registry can "garbage collect" the journal.

If the metadata registry is not saved to flash, the journal is "replayed." For example, in FIG. 4A, the metadata registry associated with journals G and H have not been saved to flash. Therefore, journals G and H are replayed. As shown in FIG. 4B, after journals G and H are saved to flash they can be freed, and the "head" of the journal list is now journal H.

When a server fails or when coming up out of power failure, the server recovers each bucket that the server is the leader for. The metadata registry 405 may comprise block shadows that indicate changes since the last committal to flash. During recovery, the registry blocks and the registry shadow blocks (where applicable) are loaded and reconstructed in RAM. Then, the latest journal is found for each bucket. The journal list is replayed from the tail to the head end (e.g., from journal G to journal H). Because the data of the journal is already stored in its final location, the registry is coordinated with the metadata changes that have occurred since the last metadata registry was stored to flash.

In an example implementation, each journal keeps the data in an idempotent way, i.e., when a journal is replayed, the state of the journal is unchanged. Therefore, when replaying a journal entry, no other journal entries are created. Replaying the journals sequentially may be time consuming, as it would take a very long time if potentially many thousands of journals are executed one at a time. There are however temporal relationships between journals that allow each journal to define a resource to serialize on. The replaying process may begin by determining the resource each journal entry uses for serialization. Then, by topologically sorting the journals, the system determines the optimal way to repetitively play all journals with as much parallelism as it possible. For example, if block groups C and D are independent of each other (with no consistency issues), journals C and D may be replayed in parallel.

Once the data is intact in the data-structure, the journal is not needed anymore. If while replaying journals, however, it was discovered that a data block and/or a journal were in error, the data may be reconstructed from the shadow data on metadata registry 405. Alternatively or in combination with block shadows in the registry 405, a data block in error may be reconstructed from other data blocks and/or protection blocks in the same stripe as the data block in error.

A bucket is not set as ready until all the journals in the bucket have been successfully replayed. If a bucket is not ready, it cannot accept new IOs or metadata operations. IOs that arrive during this time will get a return code that the bucket is not ready. This pushes the responsibility back to all the FEs, when the BEs are initializing. Therefore, the BE does not have to remember an IO or metadata operation during initialization. Once all the journals entries have been replayed, the new registry state is saved to the DFRAS and the journal up to that point can be marked for garbage collection. Once the registry is saved, a bucket is ready to handle IOs.

During load balancing, a bucket may be moved from one sever to another server, which may be on a different computer. When a bucket is sent to a different backend server, the system can wait for the "receiving" VFS backend to be fully up and operational before that backend is responsible for the bucket. This may save a few seconds of reduced performance for the pieces of metadata that the bucket manages.

While the new bucket goes up, the old bucket still handles IOs. As the IOs are being communicated with the new bucket, and the old bucket remembers the last journal head that existed once the new bucket starts working. All operations after that journal are sent from the old bucket to the new up bucket, while also being saved to the old bucket. Once the new backend is ready to serve this bucket, it lets the old backend know, and the old instance of that bucket stops accepting IOs and starts directing them to the new backend running the bucket. If for some reason the old backend fails, the new bucket can start over as a standard process.

Figure 5:
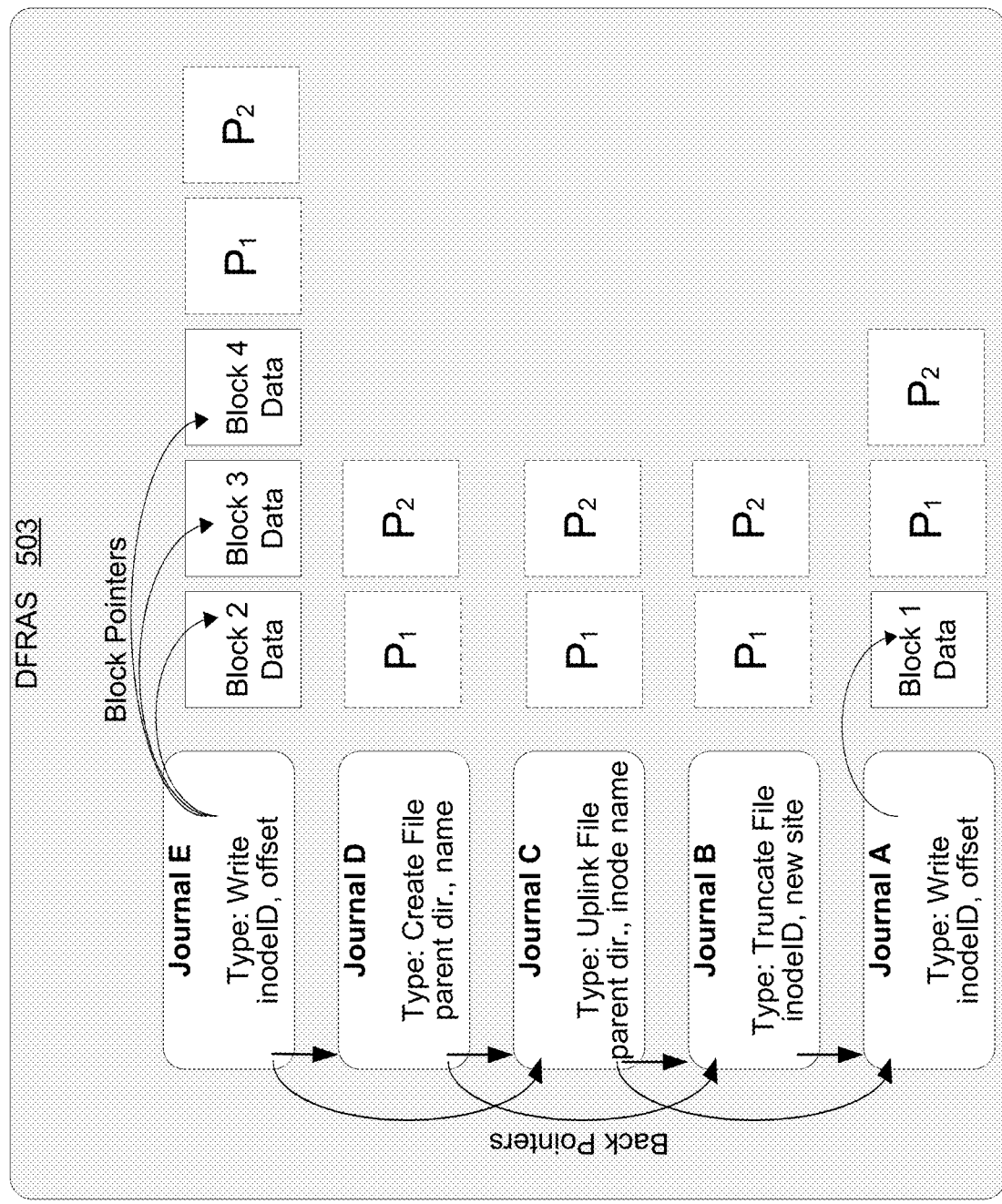
FIG. 5 illustrates another example of a journal linked list in a distributed storage system in accordance with an example implementation of this disclosure.

FIG. 5 illustrates another example of a journal linked list in a distributed storage system in accordance with an example implementation of this disclosure. The DFRAS 503 distributes data across a plurality of flash devices and ensures data is recoverable in case of component failures. Each metadata journal (e.g., journals A-E in FIG. 5) may be saved concurrently with the data (e.g., blocks 1-4 in FIG. 5) to avoid a before-perform-after phase of the traditional journal operations. This provides a better utilization for a memory device that supports a limited number of writes, such as a NAND flash device, and also has the advantage that the journals are protected using the same protection overhead as the data.

Each metadata journal (A-E) is associated with an operation and comprises an operation type (e.g., write, create file, uplink file, and truncate file) and additional parameters. The additional parameters for a write operation (e.g., journals A and E) may comprise an inodeID and an offset. The additional parameters for a create file operation (e.g., journal D) may comprise a parent directory and a file name. The additional parameters for an uplink file operation (e.g., journal C) may comprise a parent directory and an inode name. The additional parameters for a truncate file operation (e.g., journal B) may comprise an inodeID and a site.

Journals associated with write operations (e.g., journals A and E) also comprise pointers to data blocks (i.e., block pointers) and back pointer as discussed above regarding FIGS. 4A and 4B. The block pointers may comprise block IDs that ate 4 bytes long, for example.

Each row of blocks in FIG. 5 illustrates the logical stripe written for the operation and includes two protection blocks. Journals A-E in FIG. 5 illustrate one linked list. Journal A is associated with the earliest operation, and journal E is associated with the most recent operation.

Each bucket's DFRAS controls its active stripe chunk that is being written to. Each stripe chunk that is not currently active remembers where the journal tail was stored when it was last active, allowing the system to look for the actual end/tail of the journal linked list. Each time a DFRAS writes a stripe that contains a journal, the DFRAS updates, in the active stripe, the last stripe that contained a journal. Each bucket's DFRAS knows the current active stripe chunk, and thus can find the last actual stripe to be written with a journal entry. When the system goes up after a failure, only the active chunks (which are a tiny fraction of the actual system space) need to be read for each DFRAS to find its journal linked list with all the operations that were performed prior to the failure.

Each operation is journaled when it happens, and the new information is also "pushed" to the registry in form of updating the standard VFS data structures. During normal conditions, the file operations only work through the registry. The journals are used only in the case of failovers, rebalances (e.g., sending a bucket to a different backend server) and recoveries after a power failure.

Figure 6:
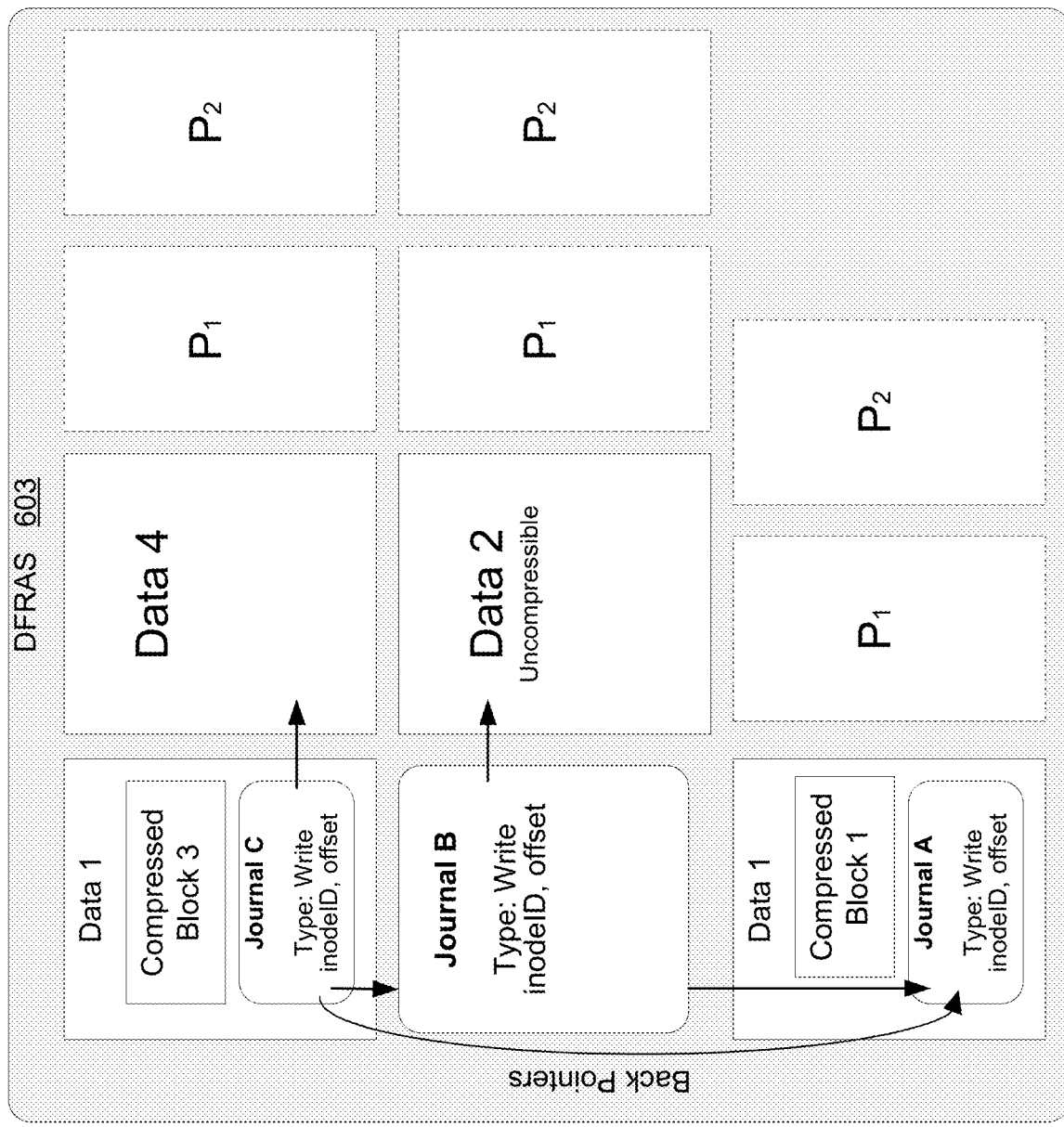
FIG. 6 illustrates metadata journals that leverage compression to reduce write amplification in a distributed storage system in accordance with an example implementation of this disclosure.

FIG. 6 illustrates metadata journals that leverage compression to reduce write amplification in a distributed storage system in accordance with an example implementation of this disclosure. When storing a journal (e.g., journal A-C in FIG. 6) and data (e.g., blocks 1-4 in FIG. 6), the DFRAS already knows where the data will be written. Therefore, the data may be written together with each journal in a single atomic way, and the journal will point to the final location of the actual data. Once the IO is acknowledged, the journal may be replayed if necessary. The ability to reply is possible because data is not written in place, and all writes are to new locations. Metadata may redirect updates on a write. Traditional storage solutions that write in place require a more complex journal operation. For example, traditional storage solutions may write the journal and the data to a side buffer, and after an acknowledgement, the old data is overwritten to free the side buffer. The "redirect on write" architecture of the current disclosure allows data write and journal write operations to be packed into a single operation. Also because the extent metadata is not updated in place, new extent data may be written into the registry that is only destaged once a destage window closes.

Data blocks 1-4 may be written to DFRAS 603 on non-volatile memory (e.g., a plurality of networked flash drives). In a first write operation, data block 1 is written. In a second write operation, data block 2 is written. And in a third write operation, data blocks 3 and 4 are written. Journals A-C are added at the beginning of write operation 1-3 respectively.

To reduce write amplification, the VFS attempts to store the journal data alongside the saved user data. Space required for the journal may be added via transparent compression. The journal data itself may not be very large. The journal points to the changed blocks. For example, block pointers and back pointers may each require 4 bytes, and an entire journal may be no larger than, for example, 40 bytes, which is 0.1% of a 4 k block. Given the small amount of memory required, if the user data is compressible at all, the provided data block or blocks should be able to offer enough space for the journal. If a group can be compressed, the associated journal is written at part of the first block of the group of one or more data blocks.

Data compression allows the write amplification of small 4 k IOs to be reduced. For DFRAS with plus 2 coding (two protection blocks on each stripe) the overhead for a 4 k write operation is already 100% (so the original data block requires two protection blocks). Because operations must also be journaled, one data block, one journal block and two protection blocks to protect are required, thereby resulting in 150% overhead. By combining the journal into the user data, the overhead is brought down from 150% to 100%. The metadata of the journal will also receive the same DFRAS protection as the data.

The first and third write operations leverage data compression to reduce write amplification. Because data block 1 is compressible, journal A is added to the 4 k page that comprises data block 1. Journal A is therefore associated with a 4 k compressible write with "plus 2" erasure coding protection, and a total of three 4 k pages are written. Because data block 3 is also compressible, journal C is added to the 4 k page that comprises data block 3. Journal C is therefore associated with a 8 k compressible write with "plus 2" erasure coding protection, and a total of four 4 k pages are written. Journal B is associated with data block 2. However, data block 2 is uncompressible. Therefore, writing uncompressible data block 2 with "plus 2" erasure coding protection requires a total of four 4 k pages.

If a block is compressed it is marked as such. The DFRAS handles compressed blocks when reading. If the DFRAS reads a compressed block with a journal, it knows to transparently strip the journal, decompress the data, and return the decompressed data to the VFS bucket or frontend.

In case of a power failure, the system needs to effectively recover the entire available journal and compare the journal to the actual saved data-structure on disk. Each piece of metadata in the registry remembers what journal is responsible for it. Even if the current state of the registry as a whole is unknown, the last journal is known because the registry stored to disk also points to the last journal entry that "created it." Because the journals are linked, the location of every journal is not required. To improve write leveling, the registry does not get written to the DFRAS frequently. If the registry was written after each operation, for example, nothing would be gained from the leveling, as one operation would result in a full block change. The registry becomes effective in write leveling if it is aggregated (or "averaged over") many operations before its state is updated on the DFRAS. For this reason, the registry state in stored in RAM, and the journals allow the content of the registry to be recreated in case of failure.

Figure 7:
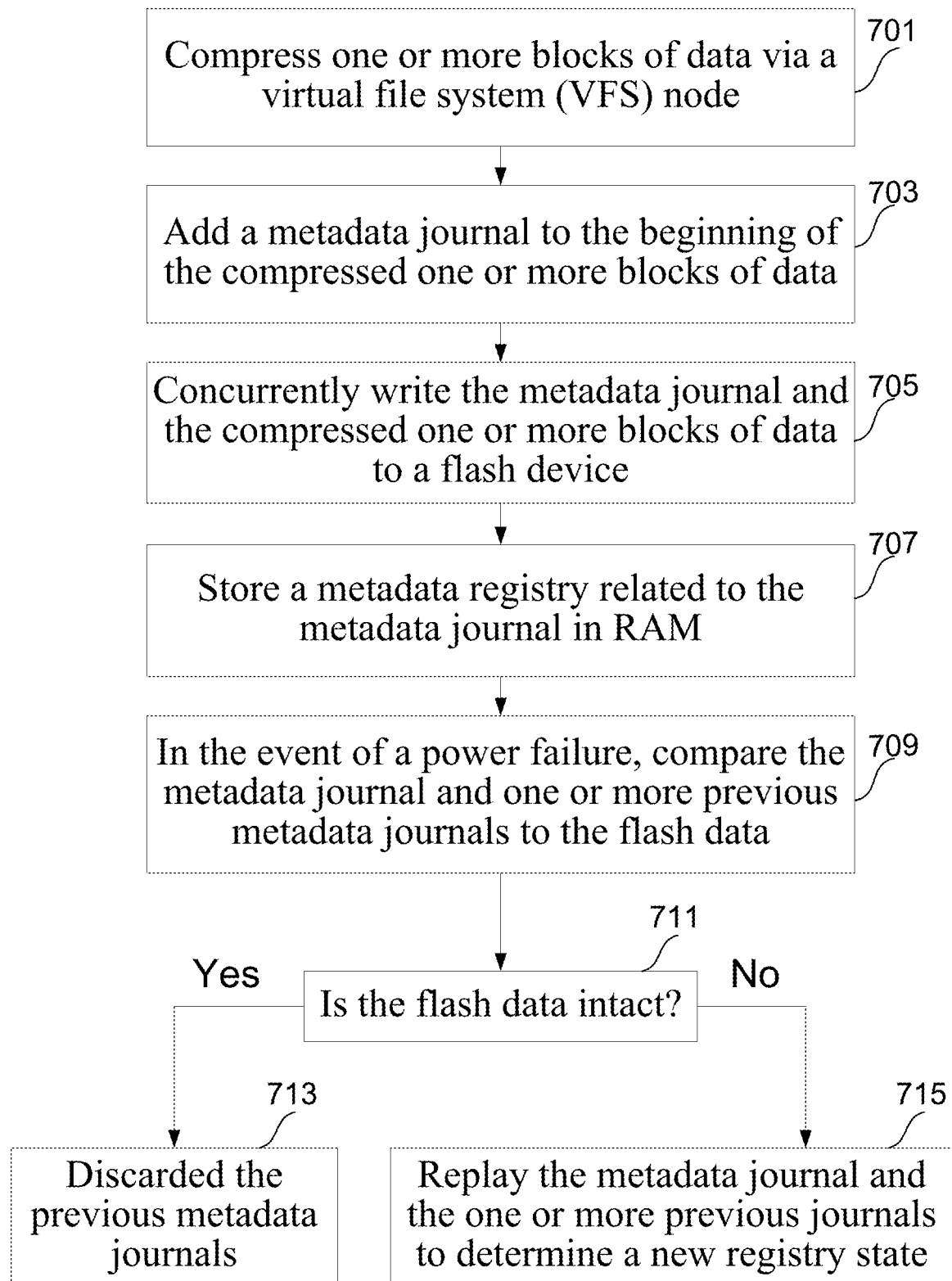
FIG. 7 is a flowchart illustrating a method for using a metadata journal in a distributed storage system in accordance with an example implementation of this disclosure.

FIG. 7 is a flowchart illustrating a method for using a metadata journal in a distributed storage system in accordance with an example implementation of this disclosure. At 701, one or more blocks of data are compressed via a computing device, such as a virtual file system (VFS) node in a distributed storage system. At 703, a metadata journal is added to the beginning of the compressed one or more blocks of data. At 705, the metadata journal and the compressed one or more blocks of data are concurrently written to a flash device (e.g., a solid state drive). The metadata journal comprises data (e.g., block pointers) associated with changes made to the flash memory by the one or more blocks of data. The metadata journal also comprises one or more back pointers to one or more previous metadata journals that are stored on the storage device.

At 707, a metadata registry related to the metadata journal is stored in volatile memory (e.g., RAM) on a VFS backend in the VFS node. The metadata registry stores the changes being made to the storage device by the one or more blocks of data. In the event of a power failure, the metadata journal and the one or more previous metadata journals are compared to the flash data at 709. At 711, the VFS backend determines whether the flash data is intact. If the flash data is intact, the metadata journal and/or the one or more previous metadata journals are discarded at 713. If the flash data is not intact, the metadata journal and the one or more previous metadata journals are replayed to determine a new metadata registry state at 715.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{((x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   a storage device; and
   a plurality of computing devices communicatively coupled to each other and to the storage device via a network, wherein:
   each of the plurality of computing devices is operable to write one or more blocks of data to the storage device,
   metadata is provided to a metadata journal as the one or more blocks of data are compressed,
   the metadata journal is associated with the changes being made to the storage device by the one or more blocks of data, the metadata journal comprises one or more back pointers to one or more previous metadata journals in the storage device, the metadata journal and the one or more previous metadata journals form a linked list that keeps track of higher level operations and ensures a persistence of the higher level operations in case of a failure, the metadata journal and the one or more previous metadata journals are configured to be replayed either sequentially or in parallel, and the system is operable to determine between a sequential replay and a parallel replay at the time of a power failure.

2. The system of claim 1, wherein each of the plurality of computing devices comprises a virtual file system (VFS) node.

3. The system of claim 2, wherein a metadata registry is maintained on a VFS backend in the VFS node.

4. The system of claim 3, wherein the VFS backend manages the metadata registry to store the changes being made to the storage device by the one or more blocks of data.

5. The system of claim 4, wherein the metadata registry comprises volatile memory on the VFS backend.

6. The system of claim 1, wherein the storage device comprises flash memory.

7. The system of claim 1, wherein the metadata journal is written to the storage device concurrently with the compressed one or more blocks of data.

8. The system of claim 7, wherein in the event of a power failure, the metadata journal and the one or more previous metadata journals are compared to data that is saved in the storage device to determine whether the saved data is intact.

9. The system of claim 8, wherein if the saved data is intact, the one or more previous metadata journals are discarded.

10. The system of claim 8, wherein if the saved data is not intact, the metadata journal and the one or more previous metadata journals are replayed to determine a new metadata registry state.

11. A method comprising:

compressing one or more blocks of data via a computing device, wherein the compressing provides, to a metadata journal, metadata associated with changes made to a storage device by the one or more blocks of data;

appending the metadata journal to the compressed one or more blocks of data; and concurrently writing the metadata journal and the compressed one or more blocks of data to the storage device, wherein:

the metadata journal comprises the metadata associated with changes made to the storage device by the one or more blocks of data, the metadata journal comprises one or more back pointers to one or more previous metadata journals in the storage device, the metadata journal and the one or more previous metadata journals form a linked list that keeps track of higher level operations and ensures a persistence of the higher level operations in case of a failure, the metadata journal and the one or more previous metadata journals are configured to be replayed either sequentially or in parallel, and determining between a sequential replay and a parallel replay occurs at the time of a power failure.

12. The method of claim 11, wherein the computing device comprises a virtual file system (VFS) node.

13. The method of claim 12, wherein the method comprises maintaining a metadata registry related to the metadata journal on a VFS backend in the VFS node.

14. The method of claim 13, wherein the method comprises managing, via the VFS backend, the metadata registry to store the changes being made to the storage device by the one or more blocks of data.

15. The method of claim 14, wherein the metadata registry comprises volatile memory on the VFS backend.

16. The method of claim 11, wherein the storage device comprises flash memory.

17. The method of claim 11, wherein the method comprises comparing the metadata journal and the one or more previous metadata journals to data that is saved on the storage device, in the event of a power failure, to determine whether the saved data is intact.

18. The method of claim 17, wherein the method comprises discarding the one or more previous metadata journals if the saved data is intact.

19. The method of claim 17, wherein the method comprises replaying the metadata journal and the one or more previous metadata journals, if the saved data is not intact, to determine a new metadata registry state.

* * * * *